Nov. 22, 1927.
S. S. McINTYRE
1,649,908
GAS ENGINE DRIVEN HOIST
Filed July 24, 1926
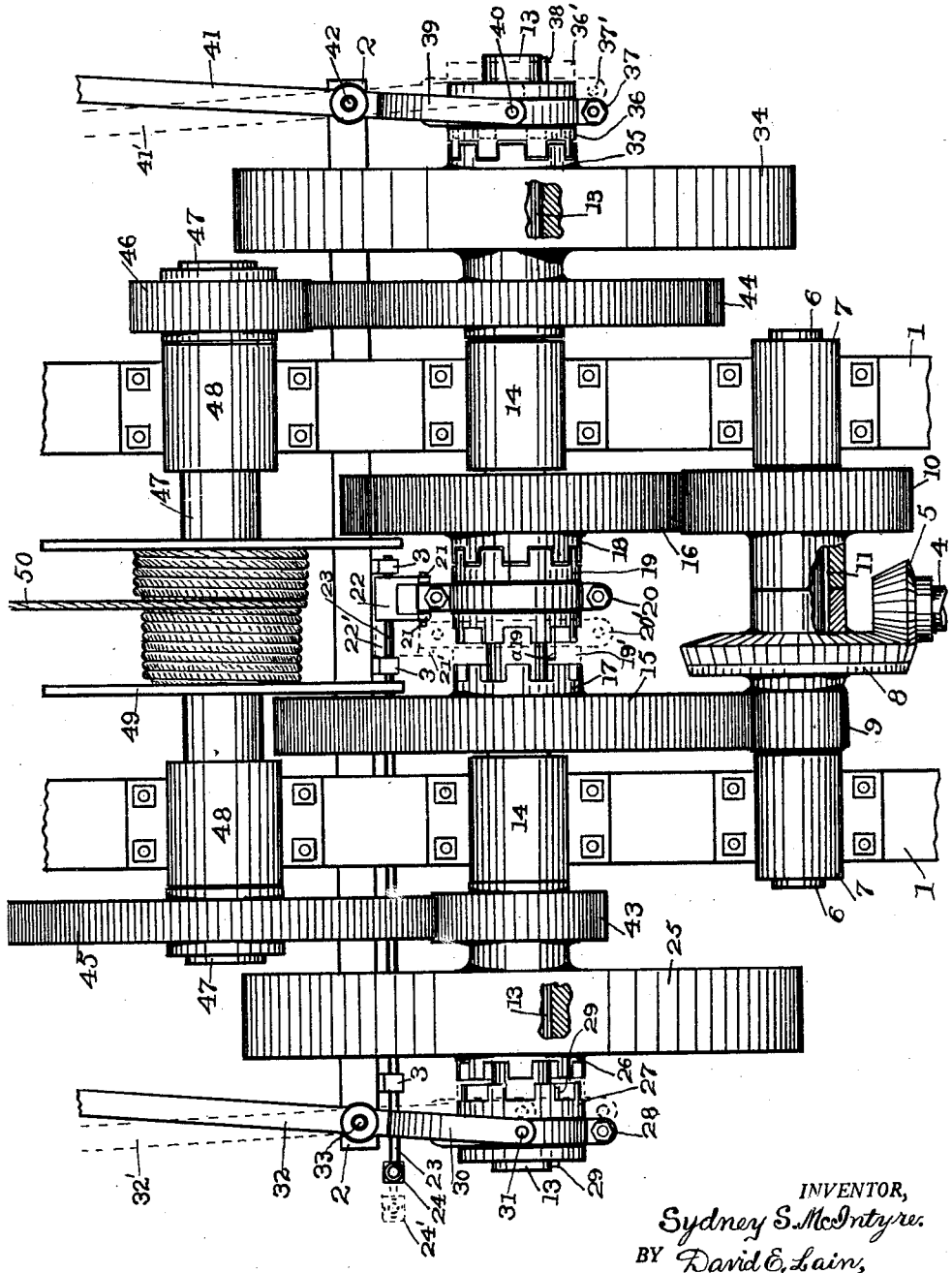
INVENTOR,
Sydney S. McIntyre.
BY David E. Lain,
ATTORNEY.

Patented Nov. 22, 1927.

1,649,908

UNITED STATES PATENT OFFICE.

SYDNEY S. McINTYRE, OF SEDRO WOOLLEY, WASHINGTON.

GAS-ENGINE-DRIVEN HOIST.

Application filed July 24, 1926. Serial No. 124,589.

My invention relates to improvements in gas-engine driven hoists, more especially used for clearing logged-off land, and one of the objects of my improvement is to provide balance wheels operable by the power connections of the hoist the momentum of which aids in maintaining drum rotation at times of extra heavy duty. And another object of my improvement is to provide a balance wheel connectible with the slow-speed side of the hoist and another balance wheel connectible with the high-speed side of the hoist in such manner that when the high-speed side is in operation the high-speed balance wheel will operate at its usual high speed while the low-speed balance wheel will operate at a speed higher than that of said high-speed balance wheel, and in this way provide a greatly increased momentum for adding to the maximum engine power when over taxed during high speed hoist operation.

I attain these objects with the mechanism illustrated in the accompanying sheet of drawings in which is shown a plan view of my hoist mechanism with both ends of the hoist frame broken away including the power plant of the hoist.

In greater detail: The sides of the hoist frame are at 1, 1, the ends thereof being broken away. Beneath the frame transversely is fastened cross beam 2 out of contact with any of the movable parts thereon. Fastened to cross beam 2 are three bearings 3 in alignment. Mounted for reciprocation in bearings 3 is rod 23.

Power shaft 4 is preferably connected through the usual power transmission with an automotive gas engine, not shown. Bevel gear 5 is fixed on the end of power shaft 4. Drive countershaft 6 is mounted for revolution in bearings 7 fastened to frame sides 1, 1. Bevel gear 8 is mounted on shaft 6 and fastened thereto by key 11. and meshes with bevel gear 5. Spur gear 9 is either integral with shaft 6 or with the hub of gear 8. Spur gear 10 is also mounted on shaft 6 and retained by key 11.

Driven countershaft 13 is mounted for revolution in bearings 14 fastened to side frames 1, 1 parallel with shaft 6. Mounted loose for revolution on shaft 13 is spur gear 15 engaged with spur gear 9. Integral with gear 15 and concentric on shaft 13 is fixed positive clutch 17. Mounted loose on shaft 13 for revolution is spur gear 16 engaged with gear 10. Integral with gear 16 concentric on shaft 13 is fixed positive clutch 18. Double-faced positive clutch 19 is mounted for reciprocation on shaft 13 engaged with spline a19 in said shaft and is engageable with either positive clutch 17 or positive clutch 18 separately and may occupy a position between them in engagement with neither one. In an annular groove in clutch 19 is mounted collar 20. The tines 21 of fork shank 22 are pinned to collar 20. Fork shank 22 is fastened on rod 23 mounted in bearings 3 as stated. Standing handle 24 is fastened to the outer end of rod 23. By reciprocating rod 23 in bearings 3 clutch 19 is moved from a neutral position between clutches 17 and 18 to engagement with either of said clutches as desired. As illustrated in full lines at 19 said clutch is engaged with clutch 18 to be driven by gear 16, while when in its dotted-line position at 19' it is engaged with clutch 17 to be driven by gear 15.

Mounted loose on one end of shaft 13 for revolution is balance wheel 25 on the slow-speed side of the hoist. Fixed positive clutch 26 is on the outer hub of balance wheel 25 concentric on shaft 13. Mounted for reciprocation on shaft 13 engaged with spline 29 therein is positive clutch 27 engageable with clutch 26. In an annular groove in clutch 27 is mounted collar 28. Yoke 30 on one end of hand lever 32 is pivotally engaged with collar 28 at 31. Lever 32 is pivotally engaged with cross beam 2 at 33. As shown in full lines clutch 27 is out of engagement with clutch 26, but by moving lever 32 to its dotted-line position at 32' clutch 27 is caused to engage with clutch 26 and balance wheel 25 is thus engaged to shaft 13 for revolution therewith.

Mounted loose on the other end of shaft 13 for revolution is balance wheel 34 on the high-speed side of the hoist. Fixed positive clutch 35 is on the outer end of the hub of balance wheel 34 concentric on shaft 13. Positive clutch 36 is mounted for reciprocation on shaft 13 engaged by spline 38 in said shaft and is engageable with clutch 35. Mounted in an annular groove in clutch 36 is collar 37. Yoke 39 is on one end of hand lever 41 which is pivoted to cross beam 2 at 42. Yoke 39 is pivoted to collar 37 at 40. As shown in full lines clutch 36 is engaged with clutch 35 to drive balance wheel 34, but when handle 41 is at 41' clutch 36 is at 36' out of engagement and balance wheel 34 is not engaged with shaft 13.

Spur gear 43 is fastened on the hub of balance wheel 25 for revolution therewith. Spur gear 44 is fastened on the hub of balance wheel 34 for revolution therewith. Gear 43 is of smaller diameter than gear 44. Gear 43 is engaged with gear 45 fastened on one end of drum shaft 47 for revolution therewith. Gear 44 is engaged with gear 46 fastened on the other end of drum shaft 47 for revolution therewith. Drum shaft 47 is mounted for revolution in bearings 48 fastened to frame 1, 1 parallel with shaft 13. Cable drum 49 is fastened to drum shaft 47 for revolution therewith. Hauling cable 50 is fastened to drum 49 for winding thereon.

Train of gears 9, 15, 43 and 45 is the low speed side of the hoist, while train of gears 10, 16, 44 and 46 constitutes the high-speed side of the hoist.

When using cable 50 for stump pulling lever 41 is at 41', lever 32 is at 32' and handle 24 is at 24' and the drive of drum 49 is through low speed train 9, 15, 43 and 45. Both balance wheels 25 and 34 revolve and 34 revolves more slowly than does balance wheel 25. While the presence of these balance wheels in the train during the low speeds is of some use, the principal value of the balance wheels will now be described.

Following the pulling of a stump or root it must be hauled by cable 50 to the pile for burning. To expedite the work it is desirable to do the hauling with the higher speeds. For this purpose hand levers 32 and 41 are set in their full-line positions as is handle 24. Thus the drive from shaft 4 is through the high-speed train 10, 16, 44 and 46, and balance wheel 34 revolves with the high speed of shaft 13. Also, since clutches 27 and 26 are now disengaged balance wheel 25 is free to revolve on shaft 13 at a rate different therefrom. This it is compelled to do for the balance wheel 25 is now driven from shaft 47 through large gear 45 to smaller gear 43 and thus must revolve at a greater speed than drum shaft 47 which moreover revolves at a higher speed than shaft 13 because gear 44 is larger than gear 46. Thus it is clear that when the high speed side of the hoist is operating both balance wheels revolve at a high speed and one of them at a considerably higher rate than the other.

The balance wheels are employed for their effectiveness and when the high speeds are used it is now clear that they enter at their maximum condition for usefulness.

To those familiar with the conditions under which land clearing must be done in the Northwest logged-off land areas, the great advantage gained by providing an automatic power boost for the gas donkey at times of excessive power requirements during high-speed hauling will be well understood. A snaggy stump being rapidly hauled by a long cable strikes an obstruction, not of itself serious. The load is held. The long cable is caused to rise thus placing an elastic strain on the gas engine hardest to endure, and, in the absence of immediate assistance, the engine may die before low-speed changes can be made. But, with my use of the high-speed balance wheel, the needed power increment is available at the instant of requirement, and the obstacle, if of the kind assumed, is passed and rapid hauling continues.

In practice, the balance wheels, as described, are found to be of great service increasing the efficiency of the gas hoist several fold.

Although a single drum is sufficient to use for the purpose of disclosing my adaptation of the principle involved, in practice I use as many as three drums on my land-clearing gas donkeys.

The principles which I have reduced to practice are of wider application than in the above-described use, all of which is within the purview of my invention; and I desire to be so understood.

Having thus disclosed my invention, what I claim as new therein and desire to secure by Letters Patent is,—

1. In a hoist, a power transmission shaft, a power countershaft drivingly connected to said transmission shaft, a low and high speed countershaft and means to connect it with said power countershaft for low-speed or for high-speed revolution, a drum shaft, two balance wheels and clutch means for connecting either of them to said low and high speed countershaft for revolution therewith, a low-speed power connection between one of said balance wheels and said drum shaft, and a high-speed power connection between the other of said balance wheels and said drum shaft.

2. A hoist consisting of a transmission power shaft, a power countershaft geared to said transmission shaft with a low and a high-speed gear fastened thereon, a low and high speed countershaft, and a drum shaft with a low and a high-speed gear fastened thereon, a low-speed gear loose on said low and high-speed countershaft engaged with said low-speed gear on said power countershaft, a high-speed gear loose on said low and high-speed countershaft engaged with said high-speed gear on said power countershaft, means to separately connect said loose low and high-speed gears with said low and high-speed countershaft, a low-speed gear loose on said low and high-speed countershaft engaged with said low-speed gear on said drum shaft, a balance wheel fastened to said last-mentioned low-speed gear, means to connect said last-mentioned low-speed gear and said balance wheel therewith to said low and high-speed countershaft, a high-speed gear loose on said low and high-speed countershaft engaged with said high-speed gear on said drum shaft, a balance wheel fastened to said last-mentioned high-speed gear, and means to connect said last-mentioned high-speed gear and balance wheel therewith to said low and high-speed countershaft.

3. In a hoist, combined low-speed and high-speed gear trains consisting of a driving shaft, a countershaft, a small spur gear fixed on said driving shaft, a large spur gear mounted loose on said countershaft and engaged with said small fixed gear, a large spur gear mounted fixed on said driving shaft, a small spur gear mounted loose on said countershaft engaged with said large fixed gear, means to separately connect either of said loose gears with said countershaft, a balance wheel and small spur gear rigidly fastened thereto mounted loose on said countershaft, means to connect said balance wheel and small gear to said countershaft, another balance wheel and large spur gear rigidly fastened thereto mounted loose on said countershaft, other means to connect said other balance wheel and large spur gear to said countershaft, a drum shaft, a cable drum mounted fixedly on said drum shaft, a large spur gear fixed on said drum shaft engaged with said small balance-wheel spur gear, a small spur gear fixed on said drum shaft engaged with said large balance-wheel spur gear, and a power shaft drivingly connected to said driving shaft.

SYDNEY S. McINTYRE.